United States Patent
Lim et al.

(10) Patent No.: US 10,800,862 B2
(45) Date of Patent: *Oct. 13, 2020

(54) AMINO SILANE-BASED COMPOUND, METHOD OF PREPARING THE SAME, AND MODIFIED CONJUGATED DIENE-BASED POLYMER INCLUDING THE COMPOUND

(71) Applicant: LG Chem, Ltd., Seoul (KR)

(72) Inventors: Won Taeck Lim, Daejeon (KR); Won Mun Choi, Daejeon (KR); Seung Ho Choi, Daejeon (KR); Ji Eun Kim, Daejeon (KR); Dae June Joe, Daejeon (KR)

(73) Assignee: LG Chem, Ltd. (KR)

( * ) Notice: Subject to any disclaimer, the term of this patent is extended or adjusted under 35 U.S.C. 154(b) by 3 days.

This patent is subject to a terminal disclaimer.

(21) Appl. No.: 16/307,213

(22) PCT Filed: Sep. 29, 2017

(86) PCT No.: PCT/KR2017/011030
§ 371 (c)(1),
(2) Date: Dec. 5, 2018

(87) PCT Pub. No.: WO2018/066949
PCT Pub. Date: Apr. 12, 2018

(65) Prior Publication Data
US 2019/0256617 A1 Aug. 22, 2019

(30) Foreign Application Priority Data

Oct. 7, 2016 (KR) ........................ 10-2016-0130063
Apr. 4, 2017 (KR) ........................ 10-2017-0043475

(51) Int. Cl.
| | |
|---|---|
| C08C 19/25 | (2006.01) |
| C07F 7/18 | (2006.01) |
| C08F 236/10 | (2006.01) |
| C08K 5/544 | (2006.01) |
| C08C 19/22 | (2006.01) |
| C07F 7/08 | (2006.01) |

(52) U.S. Cl.
CPC .............. *C08C 19/25* (2013.01); *C07F 7/081* (2013.01); *C07F 7/1804* (2013.01); *C07F 7/1892* (2013.01); *C08C 19/22* (2013.01); *C08F 236/10* (2013.01); *C08K 5/544* (2013.01); *C08F 2810/00* (2013.01); *Y02T 10/862* (2013.01)

(58) Field of Classification Search
CPC ...... C08G 65/336; C07F 7/081; C07F 7/1892; C07F 7/1804; C07F 7/10
USPC ....................................................... 525/342
See application file for complete search history.

(56) References Cited

U.S. PATENT DOCUMENTS

| | | |
|---|---|---|
| 4,397,994 A | 8/1983 | Takeuchi et al. |
| 5,277,813 A | 1/1994 | Feibush et al. |
| 9,440,997 B2 | 9/2016 | Backer et al. |
| 9,623,705 B2 | 4/2017 | Tanaka et al. |
| 2005/0203251 A1 | 9/2005 | Oshima et al. |
| 2011/0146877 A1 | 6/2011 | Tanaka et al. |
| 2014/0350152 A1 | 11/2014 | Backeer et al. |
| 2014/0350277 A1 | 11/2014 | Backer et al. |

(Continued)

FOREIGN PATENT DOCUMENTS

| | | |
|---|---|---|
| CN | 102026826 A | 4/2011 |
| CN | 103974960 A | 8/2014 |

(Continued)

OTHER PUBLICATIONS

"Impact of Different PEGylation Patterns on the Long-term Bio-Stability of Colloidal Mesoporous Silica Nanoparticles" authored by Cauda et al. and published in the Journal of Materials Chemistry (2010) 20, 8693-8699.*
Machine translation of the Specification for KR 2017/075662 (no date).*

(Continued)

*Primary Examiner* — Marc S Zimmer
(74) *Attorney, Agent, or Firm* — Lerner, David, Littenberg, Krumholz & Mentlik, LLP

(57) ABSTRACT

An amino silane-based compound, methods of preparing the same, and a modified conjugated diene-based polymer including an amino silane-based functional group are disclosed herein. In an embodiment, the amino silane-based compound is represented by Formula 1:

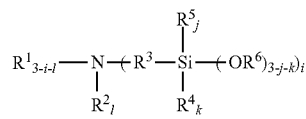

wherein, in Formula 1,
$R^1$ and $R^2$ are each independently a hydrocarbon group having 1 to 30 carbon atoms, or a glycol unit represented by

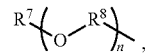

$R^3$ is a divalent hydrocarbon group having 1 to 30 carbon atoms, $R^4$, $R^5$, $R^6$, and $R^7$ are each independently a monovalent hydrocarbon group having 1 to 30 carbon atoms, $R^8$ is a divalent hydrocarbon group having 1 to 10 carbon atoms, j and k are each independently 0 or 1, n is an integer selected from 1 to 10, wherein at least one of $R^1$ or $R^2$ is the glycol unit.

19 Claims, No Drawings

(56) References Cited

U.S. PATENT DOCUMENTS

2016/0213820 A1 7/2016 Minagawa et al.
2019/0085099 A1* 3/2019 Kim .......................... C08F 8/30

FOREIGN PATENT DOCUMENTS

| CN | 105636615 | A | | 6/2016 |
|----|-----------|---|---|--------|
| JP | 2015502949 | A | | 1/2015 |
| JP | 2015504929 | A | | 2/2015 |
| KR | 20050091988 | A | | 9/2005 |
| KR | 20130090810 | A | | 8/2013 |
| KR | 20150131465 | A | | 11/2015 |
| KR | 2017/075662 | A | * | 7/2017 |
| WO | 2013083742 | A1 | | 6/2013 |
| WO | 2016131590 | A1 | | 8/2016 |
| WO | 2017001039 | A1 | | 1/2017 |
| WO | 2018066943 | A1 | | 4/2018 |

OTHER PUBLICATIONS

Extended European Search Report including Written Opinion for Application No. EP17858743.2, dated Jul. 5, 2019, pp. 1-8.
Search report from International Application No. PCT/KR2017/011030, dated Jan. 17, 2018.
Cauda et al., "Impact of different PEGylation patterns on the long-term bio-stability of colloidal mesoporous silica nanoparticles", Materials Chemistry, 2010(20), pp. 8693-8699.
Chinese Search Report for Application No. CN2017800402302 dated Mar. 19, 2020.

* cited by examiner

AMINO SILANE-BASED COMPOUND, METHOD OF PREPARING THE SAME, AND MODIFIED CONJUGATED DIENE-BASED POLYMER INCLUDING THE COMPOUND

The present application is a national phase entry under 35 U.S.C. § 371 of International Application No. PCT/KR2017/011030, filed Sep. 29, 2017, which claims priority from Korean Patent Application Nos. 10-2016-0130063, filed on Oct. 7, 2016, and 10-2017-0043475, filed on Apr. 4, 2017, the disclosures of which are incorporated herein by reference.

TECHNICAL FIELD

The present invention relates to an amino silane-based compound, and more particularly, to an amino silane-based compound having an excellent interaction with a rubber polymer and an inorganic filler, a method of preparing the same, and a modified conjugated diene-based polymer in which excellent tensile strength, abrasion resistance, low fuel consumption property, and wet road surface resistance as well as high heat generation property are obtained by including a functional group derived from the amino silane-based compound.

BACKGROUND ART

In line with the recent demand for fuel-efficient cars, a conjugated diene-based polymer having adjustment stability represented by wet road surface resistance as well as low rolling resistance and excellent abrasion resistance and tensile properties is required as a rubber material for a tire.

In order to reduce the rolling resistance of a tire, there is a method of reducing a hysteresis loss of a vulcanized rubber, and rebound resilience at 50° C. to 80° C., tan δ, or Goodrich heat generation is used as an evaluation index of the vulcanized rubber. That is, it is desirable to use a rubber material having high rebound resilience at the above temperature or low tan δ or Goodrich heat generation.

A natural rubber, a polyisoprene rubber, or a polybutadiene rubber is known as a rubber material having a low hysteresis loss, but these rubbers may have low wet road surface resistance. Thus, recently, a conjugated diene-based polymer or copolymer, such as a styrene-butadiene rubber (hereinafter, referred to as "SBR") or a butadiene rubber (hereinafter, referred to as "BR"), is prepared by emulsion polymerization or solution polymerization to be used as a rubber for a tire. Among these polymerizations, the greatest advantage of the solution polymerization in comparison to the emulsion polymerization is that a vinyl structure content and a styrene content, which specify physical properties of the rubber, may be arbitrarily adjusted and its molecular weight and physical properties may be controlled by coupling or modification. Thus, the SBR prepared by the solution polymerization is widely used as a rubber material for a tire because it is easy to change a structure of the finally prepared SBR or BR, and movement of chain ends may be reduced and a coupling force with a filler, such as silica or carbon black, may be increased by coupling or modification of the chain ends.

In a case in which the solution-polymerized SBR is used as the rubber material for a tire, since a glass transition temperature of the rubber is increased by increasing a vinyl content in the SBR, physical properties, such as running resistance and braking force, required for a tire may not only be controlled, but fuel consumption may also be reduced by appropriately adjusting the glass transition temperature. The solution-polymerized SBR is prepared by using an anionic polymerization initiator, and is being used by coupling or modification of chain ends of the formed polymer using various modifiers. For example, U.S. Pat. No. 4,397,994 discloses a technique in which active anions at chain ends of a polymer, which is obtained by polymerization of styrene-butadiene in a non-polar solvent using alkyllithium as a monofunctional initiator, are bonded by using a binder such as a tin compound.

Carbon black and silica are being used as a reinforcing filler of a tire's tread, wherein, in a case in which the silica is used as the reinforcing filler, the hysteresis loss may be lowered and the wet road surface resistance may be improved. However, since the silica having a hydrophilic surface has a low affinity with the rubber in comparison to the carbon black having a hydrophobic surface, dispersibility may be poor, and, thus, there is a need to use a separate silane coupling agent to improve the dispersibility or provide coupling between the silica and the rubber. Therefore, a method of introducing a functional group having an affinity or reactivity with the silica into the ends of rubber molecules is being performed, but its effect is insufficient.

DISCLOSURE OF THE INVENTION

Technical Problem

The present invention provides an amino silane-based compound having an excellent interaction with a rubber polymer and an inorganic filler, a method of preparing the same, a modified conjugated diene-based polymer, in which excellent tensile strength, abrasion resistance, low fuel consumption property, and wet road surface resistance as well as high heat generation property are obtained by including a functional group derived from the amino silane-based compound, and a method of preparing the modified conjugated diene-based polymer.

Technical Solution

According to an aspect of the present invention, there is provided an amino silane-based compound represented by Formula 1:

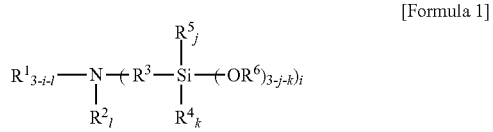

[Formula 1]

wherein, in Formula 1, $R^1$ and $R^2$ are each independently a hydrocarbon group having 1 to 30 carbon atoms, or a glycol unit represented by

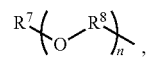

$R^3$ is a divalent hydrocarbon group having 1 to 30 carbon atoms, $R^4$, $R^5$, $R^6$, and $R^7$ are each independently a monovalent hydrocarbon group having 1 to 30 carbon atoms, $R^8$ is a divalent hydrocarbon group having 1 to 10 carbon atoms, j and k are each independently 0 or 1, n is an integer selected from 1 to 10, at least one of $R^1$ and $R^2$ is a glycol unit represented by

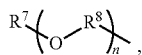

i is 1 or 2, l is 0 or 1, and 3-i-l is 1 or 2 when $R^1$ is a glycol unit represented by

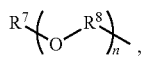

i and l are each independently 1 or 2, but are not 2 at the same time, and 3-i-l is 0 or 1 when $R^2$ is a glycol unit represented by and

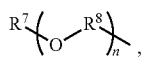

i is 1 or 2, and l is 0 or 1, and 3-i-l is 0 or 1 when both $R^1$ and $R^2$ are glycol units represented by

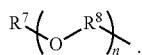

According to another aspect of the present invention, there is provided a method of preparing an amino silane-based compound which includes reacting a compound represented by Formula 2 with a compound represented by Formula 3 in a polar solvent:

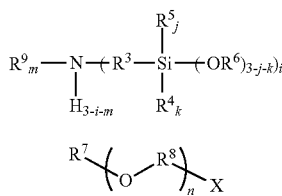

[Formula 2]

[Formula 3]

wherein, in Formulae 2 and 3, $R^3$ is a divalent hydrocarbon group having 1 to 30 carbon atoms, $R^4$, $R^5$, $R^6$, $R^7$, and $R^9$ are each independently a monovalent hydrocarbon group having 1 to 30 carbon atoms, $R^8$ is a divalent hydrocarbon group having 1 to 10 carbon atoms, i is an integer of 1 or 2, j, k, and m are each independently an integer of 0 or 1, m is 0 or 1 when i is 1, m is 0 when i is 2, n is an integer selected from 1 to 10, and X is a leaving group selected from the group consisting of a mesylate group, a tosylate group, and triflate group.

According to another aspect of the present invention, there is provided a modified conjugated diene-based polymer including the amino silane-based compound-derived function group, and a method of preparing the same.

Advantageous Effects

In a case in which a conjugated diene-based polymer is modified with an amino silane-based compound including a hydrophilic glycol unit having a high affinity with an inorganic filler, particularly, a silica-based filler, since a functional group derived from the amino silane-based compound is included at one end of the polymer, preparation of a modified conjugated diene-based polymer having an excellent interaction with the inorganic filler is possible, and the modified conjugated diene-based polymer thus prepared has excellent tensile strength, abrasion resistance, low fuel consumption property, and wet road surface resistance as well as high heat generation property.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

An amino silane-based compound according to the present invention may be represented by Formula 1 below:

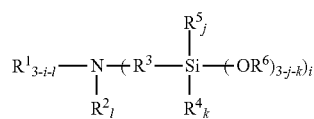

[Formula 1]

in Formula 1, $R^1$ and $R^2$ may each independently be a hydrocarbon group having 1 to 30 carbon atoms, or a glycol unit represented by

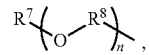

$R^3$ may be a divalent hydrocarbon group having 1 to 30 carbon atoms, $R^4$, $R^5$, $R^6$, and $R^7$ may each independently be a monovalent hydrocarbon group having 1 to carbon atoms, $R^8$ may be a divalent hydrocarbon group having 1 to 10 carbon atoms, j and k may each independently be 0 or 1, n may be an integer selected from 1 to 10, at least one of $R^1$ and $R^2$ may be a glycol unit represented by

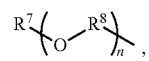

i may be 1 or 2, l may be 0 or 1, and 3-i-l may be 1 or 2 when $R^1$ is a glycol unit represented by

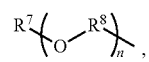

i and l may each independently be 1 or 2, but may not be 2 at the same time, and 3-i-l may be 0 or 1 when $R^2$ is a glycol unit represented by and

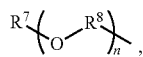

i may be 1 or 2, l may be 0 or 1, and 3-i-l may be 0 or 1 when both $R^1$ and $R^2$ are glycol units represented by

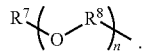

According to an embodiment of the present invention, in Formula 1,
$R^1$ and $R^2$ may each independently be a glycol unit represented by

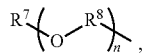

$R^3$ may be an alkylene group having 1 to 10 carbon atoms, $R^4$, $R^5$, $R^6$, and $R^7$ may each independently be an alkyl group having 1 to 10 carbon atoms, $R^8$ may be an alkylene group having 1 to 5 carbon atoms,
i may be 1 or 2, j, k, and l may each independently be 0 or 1, 3-i-l may be 0 or 1, and n may be an integer selected from 2 to 8.

According to an embodiment of the present invention, in Formula 1,
$R^1$ and $R^2$ may each independently be a glycol unit represented by

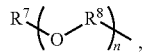

$R^3$ may be an alkylene group having 1 to 5 carbon atoms, $R^4$, $R^5$, $R^6$, and $R^7$ may each independently be an alkyl group having 1 to 5 carbon atoms, $R^8$ may be an alkylene group having 1 to 5 carbon atoms,
i may be 1 or 2, j, k, and l may each independently be 0 or 1, and 3-i-l may be 0 or 1, and n may be an integer selected from 3 to 6.

Also, the amino silane-based compound represented by Formula 1, for example, may be a compound represented by Formula 1-1 below.

[Formula 1-1]

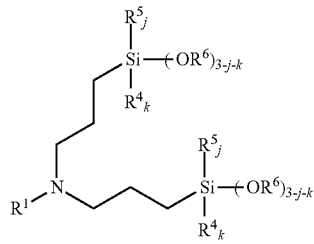

In Formula 1-1,
$R^1$ may be a glycol unit represented by

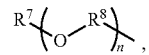

$R^4$, $R^5$, $R^6$, and $R^7$ may each independently be a monovalent hydrocarbon group having 1 to 30 carbon atoms, $R^8$ may be a divalent hydrocarbon group having 1 to 10 carbon atoms, j and k may each independently be 0 or 1, and n may be an integer selected from 1 to 10.

As a specific example, in Formula 1-1, $R^4$, $R^5$, $R^6$, and $R^7$ may each independently be a monovalent hydrocarbon group having 1 to 5 carbon atoms, $R^8$ may be a divalent hydrocarbon group having 1 to 5 carbon atoms, j and k may each independently be 0 or 1, and n may be an integer selected from 1 to 5.

Furthermore, the amino silane-based compound represented by Formula 1, for example, may be a compound represented by Formula 1-2 below.

[Formula 1-2]

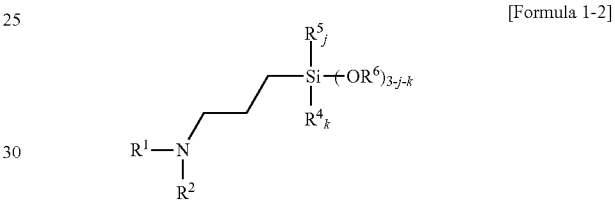

In Formula 1-2,
$R^1$ and $R^2$ may each independently be a glycol unit represented by

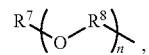

$R^4$, $R^5$, $R^6$, and $R^7$ may each independently be a monovalent hydrocarbon group having 1 to carbon atoms, $R^8$ may be a divalent hydrocarbon group having 1 to 10 carbon atoms, j and k may each independently be 0 or 1, and n may be an integer selected from 1 to 10.

As a specific example, in Formula 1-2, $R^4$, $R^5$, $R^6$, and $R^7$ may each independently be a monovalent hydrocarbon group having 1 to 5 carbon atoms, $R^8$ may be a divalent hydrocarbon group having 1 to 5 carbon atoms, j and k may each independently be 0 or 1, and n may be an integer selected from 1 to 5.

Also, the amino silane-based compound represented by Formula 1, for example, may be a compound represented by Formula 1-3 below.

[Formula 1-3]

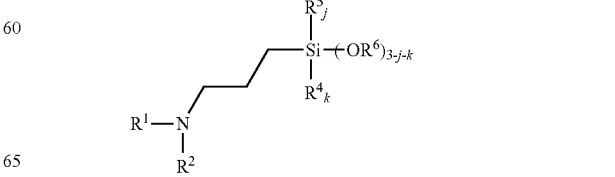

In Formula 1-3, $R^1$ may be a glycol unit represented by

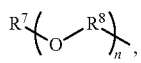

$R^2$, $R^4$, $R^5$, $R^6$, and $R^7$ may each independently be a monovalent hydrocarbon group having 1 to 30 carbon atoms, $R^8$ may be a divalent hydrocarbon group having 1 to 10 carbon atoms, j and k may each independently be 0 or 1, and n may be an integer selected from 1 to 10.

As a specific example, in Formula 1-3, $R^2$, $R^4$, $R^5$, $R^6$, and $R^7$ may each independently be a monovalent hydrocarbon group having 1 to 5 carbon atoms, $R^8$ may be a divalent hydrocarbon group having 1 to 3 carbon atoms, j and k may each independently be 0 or 1, and n may be an integer selected from 1 to 5.

The expression "monovalent hydrocarbon group" in the present invention may denote a monovalent atomic group, in which carbon and hydrogen are bonded, such as a monovalent alkyl group, alkenyl group, alkynyl group, cycloalkyl group, cycloalkyl group containing at least one unsaturated bond, and aryl group, and the monovalent atomic group may have a linear or branched structure depending on its bonding structure.

The expression "divalent hydrocarbon group" in the present invention may denote a divalent atomic group, in which carbon and hydrogen are bonded, such as a divalent alkylene group, alkenylene group, alkynylene group, cycloalkylene group, cycloalkylene group containing at least one unsaturated bond, and arylene group, and the divalent atomic group may have a linear or branched structure depending on its bonding structure.

According to an embodiment of the present invention, the amino silane-based compound represented by Formula 1 may be N,N-bis(3-(triethoxysilyl)propyl)-2,5,8,11,14-pentaoxyhexadecan-16-amine, N,N-bis(3-(diethoxy(methyl)silyl)propyl)-2,5,8,11,14-pentaoxyhexadecan-16-amine, N,N-bis(2-(2-(2-methoxyethoxy)ethoxy)ethyl)3-(triethoxysilyl)propan-1-amine, N,N-bis(2-(2-(2-butoxyethoxy)ethoxy)ethyl)-3-(triethoxysilyl)propan-1-amine, N-(2-(2-(2-methoxyethoxy)ethoxy)ethyl)-3-(triethoxysilyl)-N-(3-(triethoxysilyl)propyl)propan-1-amine, N-(2-(2-(2-methoxyethoxy)ethoxy)ethyl)-N-(3-(trimethyoxysilyl)propyl)butan-1-amine, N-(3,6,9,12-tetraoxahexadecyl)-N-(3-(triethoxysilyl)propyl)-3,6,9,12-tetraoxahexadecan-1-amine, N-(3,6,9,12,15-pentaoxanonandecyl)-N-(3-(triethoxysilyl)propyl)-3,6,9,12,15-pentaoxanonandecan-1-amine, or N,N-bis(3-(triethoxysilyl)propyl)-3,6,9,12,15,18-hexaoxodocosan-1-amine.

According to an embodiment of the present invention, the amino silane-based compound may be a modifier for modifying a conjugated diene-based polymer.

The amino silane-based compound of the present invention, for example, may be prepared by a reaction between an amine-based compound containing at least one alkoxysilyl group and a glycol ether-based compound containing a leaving group and a glycol unit.

A method of preparing an amino silane-based compound according to the present invention, for example, may include a step of reacting a compound represented by the following Formula 2 with a compound represented by the following Formula 3 in a polar solvent:

[Formula 2]

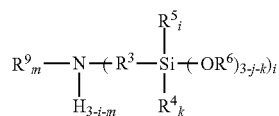

[Formula 3]

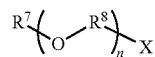

in Formulae 2 and 3, $R^3$ may be a divalent hydrocarbon group having 1 to 30 carbon atoms, $R^4$, $R^5$, $R^6$, $R^7$, and $R^9$ may each independently be a monovalent hydrocarbon group having 1 to 30 carbon atoms, $R^8$ may be a divalent hydrocarbon group having 1 to 10 carbon atoms, i may be 1 or 2, j, k, and m may each independently be 0 or 1, m may be 0 or 1 when i is 1, m may be 0 when i is 2, n may be an integer selected from 1 to 10, and X may be a leaving group selected from the group consisting of a mesylate group, a tosylate group, and triflate group.

According to an embodiment of the present invention, in Formulae 2 and 3, $R^3$ may be an alkylene group having 1 to 10 carbon atoms, $R^4$, $R^5$, $R^6$, and $R^7$ may each independently be an alkyl group having 1 to 10 carbon atoms, $R^8$ may be an alkylene group having 1 to 5 carbon atoms, i may be 1 or 2, j, k, and m may each independently be 0 or 1, m may be 0 or 1 when i is 1, m may be 0 when i is 2, n may be an integer selected from 2 to 8, and X may be a mesylate group or a tosylate group.

According to an embodiment of the present invention, in Formulae 2 and 3, $R^3$ may be an alkylene group having 1 to 5 carbon atoms, $R^4$, $R^5$, $R^6$, and $R^7$ may each independently be an alkyl group having 1 to 5 carbon atoms, $R^8$ may be an alkylene group having 1 to 5 carbon atoms, i may be 1 or 2, j, k, and m may each independently be 0 or 1, m may be 0 or 1 when i is 1, m may be 0 when i is 2, n may be an integer selected from 3 to 6, and X may be a tosylate group.

According to an embodiment of the present invention, the compound represented by Formula 2 may include 3-(triethoxysilyl)propan-1-amine, bis((ethoxy(methyl)(phenyl)silyl)methyl)amine, bis((diethoxy(methyl)silyl)methyl)amine, 3-(diethoxy (methoxy)silyl)-N-(3-diethoxy (methoxy)silyl)propyl)-2-methylpropan-1-amine, 3-(ethoxydimethoxysilyl)-N-(3-(ethoxydimethoxysilyl)propyl)-2-propan-1-amine, 2-methyl-3-(triethoxysilyl)-N-(3-(triethoxysilyl)propyl)propan-1-amine, 5-(triethoxysilyl)-N-(3-(triethoxysilyl)propyl)pentan-1-amine, N-(3-(trimethoxysilyl)propyl)butan-1-amine, bis(2-(trimethoxysilyl)ethyl)amine, bis(2-(triethoxysilyl)ethyl) amine, bis(triethoxysilyl)methyl)amine, bis(ethoxydimethylsilyl)methyl)amine, bis(dimethoxy(methyl)silyl)methyl) amine, bis((trimethoxysilyl)methyl)amine, bis(3-(diethoxy (methoxy)silyl)propyl)amine, 2-methyl-3-(trimethoxysilyl)-N-(3-(trimethoxysilyl)propyl)propan-1-amine, bis(2-methyl-3-(trimethoxysilyl)propyl)amine, bis(8- triethoxysilyl)octyl)amine, bis(2-methyl-3-(tripropoxysilyl) propyl)amine, bis(2-methyl-3-(triethoxylsilyl)propyl) amine, bis(3-(methoxydimethylsilyl)propyl)amine, bis(3-(diethoxy(methyl)silyl)-2-methylpropyl)amine, bis(2-(triisopropoxysilyl)ethyl)amine, bis(3-(ethoxydimethoxysilyl)-2-methylpropyl)amine, 8-(trimethoxysilyl)-N-(3-(trimethoxyxilyl)propyl)octan-1-amine, bis(3-(triisopropylsilyl)propyl)amine, bis(8-(trimethoxysilyl)octyl)amine, bis(3-(triethoxysilyl)propyl) amine, bis(4-(triethoxysilyl)butyl)amine, bis(3-(diethoxy (methyl)silyl)propyl)amine, bis(2-(tripropoxysilyl)ethyl) amine, bis(3-(ethoxydimethoxysilyl) propyl)amine, bis(4-(trimethoxysilyl)butyl)amine, bis(3-(trimethoxysilyl) propyl)amine, bis(3-(tripropoxysilyl)propyl)amine, bis(3-(diethoxy(methoxy)silyl)-2-methylpropyl)amine, bis(3-(dimethoxy(methyl)silyl)-2-methylpropyl)amine, or bis(3-(dimethoxy(methyl)silyl)propyl)amine, and any one thereof or a mixture of two or more thereof may be used.

According to an embodiment of the present invention, with respect to the glycol ether-based compound represented by Formula 3, since separation of an atomic group or atomic group ions is easy during a substitution or elimination reaction, the glycol ether-based compound represented by Formula 3 contains a leaving group selected from the group consisting of a mesylate group, a tosylate group, and a triflate group which may be expressed as a good leaving group. Thus, since synthesis and removal are easy during the substitution reaction according to an $S_N2$ reaction mechanism between the compound represented by Formula 2 and the compound represented by Formula 3, the amino-silane-based compound according to the present invention may be obtained with high purity and yield, and, accordingly, economic efficiency and productivity may be secured.

According to an embodiment of the present invention, during the reaction, the compound represented by Formula 2 and the compound represented by Formula 3 may be used in stoichiometric amounts, and may specifically be used in a molar ratio (Formula 2:Formula 3) of 1:1 to 1:5, 1:1 to 1:3, or 1:1 to 1:2, and the purity and yield of the amino-silane-based compound are excellent within this range.

As another example, the reaction may be performed at a reaction temperature of 10° C. to 100° C., 20° C. to 90° C., or 50° C. to 80° C., and the purity and yield of the amino-silane-based compound are excellent within this range.

The reaction may be performed by including a polar additive, and, as a specific example, the polar additive may be an inorganic material or an organic material, wherein the inorganic polar additive, for example, may include a hydride containing an alkali metal or alkaline earth metal; a hydroxide containing an alkali metal or alkaline earth metal; or a carbonate containing an alkali metal or alkaline earth metal, any one thereof or a mixture of two or more thereof may be used, the organic polar additive, for example, may include an amine-based base; or an alkoxy-based base, and any one thereof or a mixture of two or more thereof may be used. For example, the polar additive may be triethylamine. According to an embodiment of the present invention, during the substitution reaction according to the $S_N2$ reaction mechanism between the compound represented by Formula 2 and the compound represented by Formula 3, the polar additive may act as a Lewis base for removing protons remaining in an amine group (Lewis acid) after the reaction, and, in a case in which the reaction is performed by including the polar additive, a reaction rate is improved, and the purity and yield of the amino-silane-based compound are excellent.

According to an embodiment of the present invention, the polar solvent may be a polar aprotic solvent, specific examples of the polar solvent may be an amide-based solvent; an ether-based solvent; a ketone-based solvent; a sulfoxide-based solvent; a nitrile-based solvent; or an alcohol-based solvent such as isopropyl alcohol (IPA), and any one thereof or a mixture of two or more thereof may be used. For example, the polar solvent may be acetonitrile.

A modified conjugated diene-based polymer according to the present invention may include a conjugated diene-based monomer-derived repeating unit, and may include an amino silane-based compound-derived function group represented by the following Formula 1 at one end.

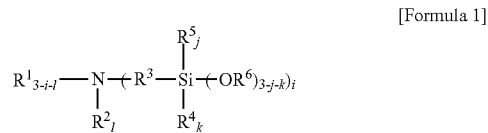

[Formula 1]

The definition of each substituent of Formula 1 is as defined above.

The conjugated diene-based monomer-derived repeating unit may denote a repeating unit formed by polymerization of a conjugated diene-based monomer, and the conjugated diene-based monomer, for example, may include at least one selected from the group consisting of 1,3-butadiene, 2,3-dimethyl-1,3-butadiene, piperylene, 3-butyl-1,3-octadiene, isoprene, 2-phenyl-1,3-butadiene, and 2-halo-1,3-butadiene (the expression "halo" denotes a halogen atom).

The modified conjugated diene-based polymer, for example, may be a copolymer further including an aromatic vinyl monomer-derived repeating unit in addition to the conjugated diene-based monomer-derived repeating unit.

The aromatic vinyl monomer-derived repeating unit may denote a repeating unit formed by polymerization of an aromatic vinyl monomer, and the aromatic vinyl monomer, for example, may include at least one selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene.

In a case in which the modified conjugated diene-based polymer is the copolymer including the aromatic vinyl monomer-derived repeating unit, the modified conjugated diene-based polymer may include the conjugated diene-based monomer-derived repeating unit in an amount of 50 wt % to 95 wt %, 55 wt % to 90 wt %, or 60 wt % to 90 wt %, and the aromatic vinyl monomer-derived repeating unit in an amount of 5 wt % to 50 wt %, 10 wt % to 45 wt %, or 10 wt % to 40 wt %, and rolling resistance, wet road surface resistance, and abrasion resistance are excellent within this range.

According to an embodiment of the present invention, the copolymer may be a random copolymer, and, in this case, a balance between physical properties is excellent. The random copolymer may denote that repeating units constituting the copolymer are disorderly arranged.

The modified conjugated diene-based polymer according to an embodiment of the present invention may have a number-average molecular weight (Mn) of 10,000 g/mol to 2,000,000 g/mol, 100,000 g/mol to 1,500,000 g/mol, or 200,000 g/mol to 800,000 g/mol, and may have a weight-average molecular weight (Mw) of 10,000 g/mol to 5,000, 000 g/mol, 150,000 g/mol to 3,000,000 g/mol, or 300,000 g/mol to 1,500,000 g/mol, and the rolling resistance and wet road surface resistance are excellent within this range. As another example, the modified conjugated diene-based polymer may have a molecular weight distribution (Mw/Mn) of 1.0 to 5.0, 1.1 to 3.0, or 1.3 to 3.0, and the balance between physical properties is excellent within this range.

As another example, the modified conjugated diene-based polymer may have a Mooney viscosity (MV) at 100° C. of 20 to 180, 40 to 150, 60 to 110, or 80 to 110, and processability and productivity are excellent within this range.

Also, the modified conjugated diene-based polymer may have a vinyl content of 5 wt % or more, 10 wt % or more, or 10 wt % to 50 wt %, and, since a glass transition temperature may be adjusted to an appropriate range, the rolling resistance, wet road surface resistance, and low fuel consumption property are excellent within this range. Herein, the vinyl content may denote a content of a 1,2-added conjugated diene-based monomer rather than a 1,4-added conjugated diene-based monomer based on 100 wt % of the conjugated diene-based copolymer composed of a monomer having a vinyl group and an aromatic vinyl-based monomer.

The expressions "derived repeating unit" and "derived functional group" in the present invention may denote a component or structure generated from a certain material or may denote the material itself.

A method of preparing a modified conjugated diene-based polymer according to the present invention may include a step (S1) of preparing an active polymer coupled with an organometal by polymerization of a conjugated diene-based monomer, or an aromatic vinyl-based monomer with a conjugated diene-based monomer in a hydrocarbon solvent including an organometallic compound; and a step (S2) of reacting the active polymer with an amino silane-based compound represented by Formula 1 below.

[Formula 1]

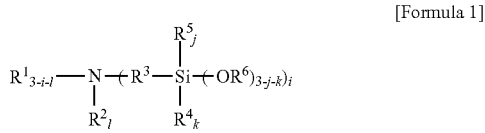

The definition of each substituent of Formula 1 is as defined above.

The hydrocarbon solvent is not particularly limited, but, for example, may be at least one selected from the group consisting of n-pentane, n-hexane, n-heptane, isooctane, cyclohexane, toluene, benzene and xylene.

According to an embodiment of the present invention, the compound represented by Formula 1 may be used in an amount of 0.01 mmol to 10 mmol, 0.05 mmol to 5 mmol, 0.1 mmol to 2 mmol, or 0.1 mmol to 1 mmol based on total 100 g of the monomer.

According to an embodiment of the present invention, the organometallic compound may be used in an amount of 0.01 mmol to 10 mmol, 0.05 mmol to 5 mmol, 0.1 mmol to 2 mmol, or 0.1 mmol to 1 mmol based on total 100 g of the monomer.

The organometallic compound, for example, may include at least one selected from the group consisting of methyllithium, ethyllithium, propyllithium, n-butyllithium, s-butyllithium, t-butyllithium, hexyllithium, n-decyllithium, t-octyllithium, phenyllithium, 1-naphtyllithium, n-eicosyllithium, 4-butylphenyllithium, 4-tolyllithium, cyclohexyllithium, 3,5-di-n-heptylcyclohexyllithium, 4-cyclopentyllithium, naphtylsodium, naphtylpotassium, lithium alkoxide, sodium alkoxide, potassium alkoxide, lithium sulfonate, sodium sulfonate, potassium sulfonate, lithium amide, sodium amide, potassium amide, and lithium isopropylamide.

The polymerization of the step (S1) may be performed by including a polar additive, and the polar additive may be added in an amount of 0.001 g to 50 g, 0.001 g to 10 g, or 0.005 g to 0.1 g based on total 100 g of the monomer. Also, the polar additive may be at least one selected from the group consisting of tetrahydrofuran, ditetrahydrofurylpropane, diethylether, cycloamylether, dipropyl ether, ethylene dimethyl ether, diethyl glycol, dimethyl ether, tertiary butoxyethoxyethane, bis(3-dimethylaminoethyl)ether, (dimethylaminoethyl)ethylether, trimethylamine, triethylamine, tripropylamine, and tetramethylethylenediamine, and, for example, may be triethylamine or tetramethylethylenediamine, the polar additive may be the same or different from a polar additive which may be added during the preparation of the amino silane-based compound, and, in a case in which the conjugated diene-based monomers, or the conjugated diene-based monomer and the aromatic vinyl-based monomer are copolymerized by including the polar additive, since the polar additive compensates a difference in reaction rates of these monomers, it has an effect of inducing the random copolymer to be easily formed.

The polymerization of the step (S1), for example, may be anionic polymerization, and, specifically, may be living anionic polymerization in which an anionic active site at polymerization end is obtained by a growth polymerization reaction by anions. Also, the polymerization of the step (S1) may be temperature rise polymerization, isothermal polymerization, or constant temperature polymerization (adiabatic polymerization), the constant temperature polymerization may denote a polymerization method including a step of performing polymerization not by randomly applying heat but with its own reaction heat after an organometallic compound is added, the temperature rise polymerization may denote a polymerization method in which the temperature is increased by randomly applying heat after the organometallic compound is added, and the isothermal polymerization may denote a polymerization method in which the temperature of the polymer is constantly maintained by taking away heat or applying heat after the organometallic compound is added. Furthermore, the polymerization of the step (S1), for example, may be performed in a temperature range of −20° C. to 200° C., 0° C. to 150° C., or 10° C. to 120° C.

The active polymer prepared in the step (S1) may denote a polymer in which a polymeric anion is combined with an organometallic cation.

According to an embodiment of the present invention, the amino silane-based compound represented by Formula 1 may be used in an amount of 0.01 mol to 10 mol, 0.05 mol to 5 mol, or 0.1 mol to 2 mol with respect to 1 mol of the organometallic compound, and, since the optimal modification reaction may be performed within this range, a conjugated diene-based polymer having a high modification ratio may be obtained.

The reaction of the step (S2) is a modification reaction for the introduction of a functional group derived from the amino silane-based compound into the active polymer, wherein the reaction may be performed in a temperature range of 0° C. to 90° C. for 1 minute to 5 hours.

Also, according to an embodiment of the present invention, the method of preparing a modified conjugated diene-based polymer may be performed by a batch polymerization method or a continuous polymerization method including one or more reactors.

The method of preparing a modified conjugated diene-based polymer, for example, may further include at least one step of recovering solvent and unreacted monomer and drying, if necessary, after the step (S2).

According to the present invention, provided is a rubber composition including the above-described modified conjugated diene-based polymer.

The rubber composition may include the modified conjugated diene-based polymer in an amount of 10 wt % or more, 10 wt % to 100 wt %, or 20 wt % to 90 wt %, and mechanical properties, such as tensile strength and abrasion resistance, are excellent and the balance between physical properties is excellent within this range.

Furthermore, the rubber composition may further include another rubber component, if necessary, in addition to the modified conjugated diene-based polymer, and, in this case, the rubber component may be included in an amount of 90 wt % or less based on a total weight of the rubber composition. Specifically, the other rubber component may be included in an amount of 1 part by weight to 900 parts by weight based on 100 parts by weight of the modified conjugated diene-based polymer.

The rubber component, for example, may be a natural rubber or a synthetic rubber, and specific examples of the rubber component may be a natural rubber (NR) including cis-1,4-polyisoprene; a modified natural rubber, such as an epoxidized natural rubber (ENR), a deproteinized natural rubber (DPNR), and a hydrogenated natural rubber, in which the general natural rubber is modified or purified; and a synthetic rubber such as a styrene-butadiene rubber (SBR), polybutadiene (BR), polyisoprene (IR), a butyl rubber (IIR), an ethylene-propylene copolymer, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), a polysulfide rubber, an acrylic rubber, an urethane rubber, a silicon rubber, an epichlorohydrin rubber, a butyl rubber, and a halogenated butyl rubber. Any one thereof or a mixture of two or more thereof may be used.

The rubber composition, for example, may include 0.1 part by weight to 200 parts by weight or 10 parts by weight to 120 parts by weight of a filler based on 100 parts by weight of the modified conjugated diene-based polymer of the present invention. The filler, for example, may be a silica-based filler, specific examples of the silica-based filler may be wet silica (hydrous silicic acid), dry silica (anhydrous silicic acid), calcium silicate, aluminum silicate, or colloidal silica, and the filler may preferably be wet silica in which an effect of improving both fracture characteristics and wet grip is the most significant. Also, the rubber composition may further include a carbon black-based filler, if necessary.

As another example, in a case in which silica is used as the filler, a silane coupling agent for the improvement of reinforcement and low heat generation property may be used together. Specific examples of the silane coupling agent may be bis(3-triethoxysilylpropyl)tetrasulfide, bis(3-triethoxysilylpropyl)trisulfide, bis(3-triethoxysilylpropyl)disulfide, bis (2-triethoxysilylethyl)tetrasulfide, bis(3-trimethoxysilylpropyl)tetrasulfide, bis(2-trimethoxysilylethyl)tetrasulfide, 3-mercaptopropyl trimethoxysilane, 3-mercaptopropyl triethoxysilane, 2-mercaptoethyl trimethoxysilane, 2-mercaptoethyl triethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropyl benzothiazolyl tetrasulfide, 3-triethoxysilylpropyl benzolyl tetrasulfide, 3-triethoxysilylpropyl methacrylate monosulfide, 3-trimethoxysilylpropyl methacrylate monosulfide, bis(3-diethoxymethylsilylpropyl)tetrasulfide, 3-mercaptopropyl dimethoxymethylsilane, dimethoxymethylsilylpropyl-N,N-dimethylthiocarbamoyl tetrasulfide, or dimethoxymethylsilylpropyl benzothiazolyl tetrasulfide, and any one thereof or a mixture of two or more thereof may be used. In consideration of the effect of improving the reinforcement, the silane coupling agent may preferably be bis(3-triethoxysilylpropyl)polysulfide or 3-trimethoxysilylpropyl benzothiazyl tetrasulfide.

Also, in the rubber composition according to an embodiment of the present invention, since the modified conjugated diene-based polymer, in which a function group having a high affinity with the silica is introduced into the active site, is used as the rubber component, a mixing amount of the silane coupling agent may be reduced in comparison to a conventional case. Accordingly, the silane coupling agent may be used in an amount of 1 part by weight to 20 parts by weight or 5 parts by weight to 15 parts by weight based on 100 parts by weight of the silica. Within this range, the silane coupling agent may prevent gelation of the rubber component while sufficiently having an effect as a coupling agent.

The rubber composition according to the embodiment of the present invention may be sulfur cross-linkable, and may further include a vulcanizing agent. The vulcanizing agent may specifically be sulfur powder, and may be included in an amount of 0.1 part by weight to 10 parts by weight based on 100 parts by weight of the rubber component, and, within this range, the low fuel consumption property is excellent while securing elastic modulus and strength required for the vulcanized rubber composition.

The rubber composition according to the embodiment of the present invention may further include various additives, such as a vulcanization accelerator, process oil, a plasticizer, an antioxidant, a scorch inhibitor, zinc white, stearic acid, a thermosetting resin, or a thermoplastic resin, used in the general rubber industry, in addition to the above-described components.

For example, a thiazole-based compound, such as 2-mercaptobenzothiazole (M), dibenzothiazyl disulfide (DM), and N-cyclohexylbenzothiazole-2-sulfenamide (CZ), or a guanidine-based compound, such as diphenylguanidine (DPG), may be used as the vulcanization accelerator, and the vulcanization accelerator may be included in an amount of 0.1 part by weight to 5 parts by weight based on 100 parts by weight of the rubber component.

The process oil acts as a softener in the rubber composition, wherein examples of the process oil may be a paraffin-based, naphthenic-based, or aromatic-based compound, the aromatic-based process oil may be used in consideration of tensile strength and abrasion resistance, and the naphthenic-based or paraffin-based process oil may be used in consideration of hysteresis loss and low temperature characteristics. The process oil, for example, may be included in an amount of 100 parts by weight or less based on 100 parts by weight of the rubber component, and, within this range, decreases in tensile strength and low heat generation property (low fuel consumption property) of the vulcanized rubber may be prevented.

Examples of the antioxidant may be N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a high-temperature condensate of diphenylamine and acetone, and the antioxidant may be used in an amount of 0.1 part by weight to 6 parts by weight based on 100 parts by weight of the rubber component.

The rubber composition according to the embodiment of the present invention may be obtained by kneading the above mixing formulation using a kneader such as a Banbury mixer, a roll, and an internal mixer, and a rubber composition having excellent abrasion resistance as well as low heat generation property may also be obtained by a vulcanization process after molding.

Accordingly, the rubber composition may be suitable for the preparation of each member of a tire, such as a tire's tread, an under tread, a sidewall, a carcass coating rubber, a belt coating rubber, a bead filler, a chafer, or a bead coating rubber, or various industrial rubber products such as an anti-vibration rubber, a belt conveyor, and a hose.

In addition, the present invention provides a tire prepared by using the rubber composition.

The tire may include a tire or a tire's tread.

Hereinafter, the present invention will be described in more detail, according to specific examples. However, the following examples are merely presented to exemplify the present invention, and the scope of the present invention is not limited thereto.

PREPARATION EXAMPLES

Preparation Example 1

Preparation of N,N-bis(3-(triethoxysilyl)propyl)-2,5,8,11,14-pentaoxyhexadecan-16-amine 20.2 g (200 mmol) of triethylamine was added to 50 ml of acetonitrile, in which 48.8 g (120 mmol) of 2,5,8,11,14-pentaoxyhexadecan-16-yl 4-methylbenzenesulfonate was dissolved, and stirred. 50 ml of acetonitrile, in which 42.5 g (100 mmol) of bis(3-(triethoxysilyl)propyl)amine was dissolved, was added to the stirred reaction solution, and then stirred for 16 hours while heating at 70° C. Thereafter, after a volatile solvent was removed under reduced pressure and a residue was extracted with hexane, the hexane was removed by vacuum distillation to obtain 46.9 g (71 mmol, 71% yield) of light yellow oil as a compound having a structure of the following Formula 1a, and a $^1$H nuclear magnetic resonance spectrum was observed.

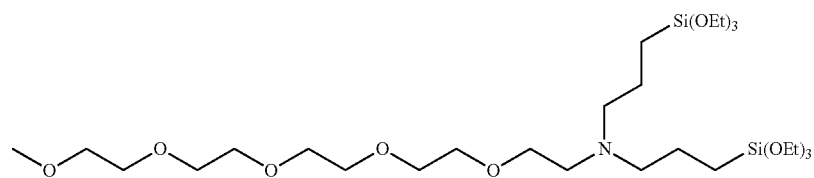

[Formula 1a]

$^1$H NMR (CDCl$_3$, 500 MHz) δ 3.81 (q, 12H), 3.66-3.52 (m, 18H), 3.38 (s, 3H), 2.66 (dd, 2H), 2.45 (dd, 4H), 1.53 (m, 4H), 1.22 (t, 18H), 0.57 (dd, 4H).

Preparation Example 2

Preparation of N,N-bis(3-diethoxy(methyl)silyl)propyl)-2,5,8,11,14-pentaoxyhexadecan-16-amine 40.5 g (400 mmol) of triethylamine was added to 50 ml of acetonitrile, in which 97.6 g (240 mmol) of 2,5,8,11,14-pentaoxyhexadecan-16-yl 4-methylbenzenesulfonate was dissolved, and stirred. 50 ml of acetonitrile, in which 73.1 g (200 mmol) of bis(3-diethoxy(methyl)silyl)propyl)amine was dissolved, was added to the stirred reaction solution, and then stirred for 16 hours while heating at 70° C. Thereafter, after a volatile solvent was removed under reduced pressure and a residue was extracted with hexane, the hexane was removed by vacuum distillation to obtain 90.0 g (150 mmol, 75% yield) of light yellow oil as a compound having a structure of the following Formula 1b, and a $^1$H nuclear magnetic resonance spectrum was observed.

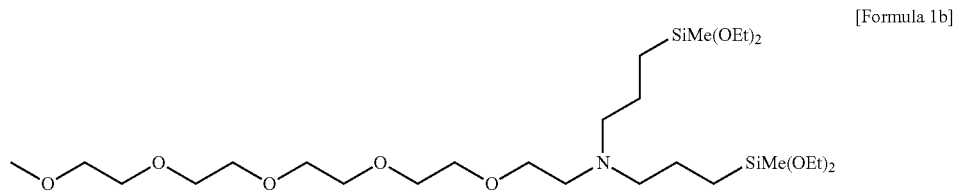

[Formula 1b]

$^1$H NMR (CDCl$_3$, 500 MHz) δ 3.76 (q, 8H), 3.65-3.52 (m, 18H), 3.38 (s, 3H), 2.66 (dd, 2H), 2.45 (dd, 4H), 1.49 (m, 4H), 1.22 (t, 12H), 0.55 (dd, 4H), 0.11 (s, 6H).

Preparation Example 3

Preparation of N,N-bis(2-(2-(2-methoxyethoxy)ethoxy)ethyl)-3-(triethoxysilyl)propan-1-amine 1.01 g (10 mmol) of triethylamine was added to 2.5 ml of acetonitrile, in which 3.50 g (11 mmol) of 2-(2-(2-methoxyethoxy)ethoxy)ethyl 4-methylbenzenesulfonate was dissolved, and stirred. 2.5 ml of acetonitrile, in which 1.11 g (5 mmol) of 3-(triethoxysilyl)propan-1-amine was dissolved, was added to the stirred reaction solution, and then stirred for 24 hours while heating at 70° C. Thereafter, after a volatile solvent was removed under reduced pressure and a residue was extracted with hexane, the hexane was removed by vacuum distillation to obtain 1.72 g (3.35 mmol, 67% yield) of light yellow oil as a compound having a structure of the following Formula 1c, and a $^1$H nuclear magnetic resonance spectrum was observed.

[Formula 1c]

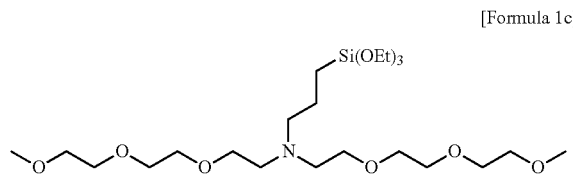

$^1$H NMR (CDCl$_3$, 500 MHz) δ 3.81 (q, 6H), 3.63-3.52 (m, 20H), 3.38 (s, 6H), 2.71 (dd, 4H), 2.51 (dd, 2H), 1.54 (m, 2H), 1.22 (t, 9H), 0.56 (dd, 2H).

Preparation Example 4

Preparation of N,N-bis(2-(2-(2-butoxyethoxy)ethoxy)ethyl)-3-(triethoxysilyl)propan-1-amine 12.65 g (125 mmol) of triethylamine was added to 25 ml of acetonitrile, in which 11.1 g (50 mmol) of 3-(triethoxysilyl)propan-1-amine was dissolved, and stirred. 25 ml of acetonitrile, in which 45.06 g (125 mmol) of 2-(2-(2-butoxyethoxy)ethoxy)ethyl 4-methylbenzenesulfonate was dissolved, was added to the stirred reaction solution, and then stirred for 24 hours while heating at 70° C. Thereafter, after a volatile solvent was removed under reduced pressure and a residue was extracted with hexane, the hexane was removed by vacuum distillation to obtain 24.5 g (41 mmol, 82% yield) of light yellow oil as a compound having a structure of the following Formula 1d, and a $^1$H nuclear magnetic resonance spectrum was observed.

[Formula 1d]

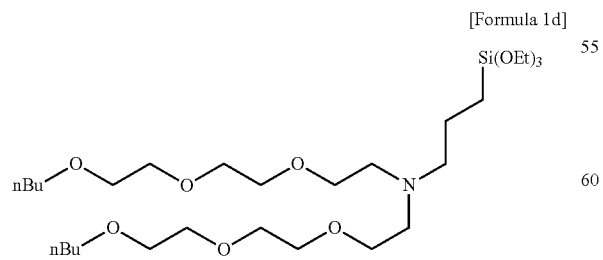

$^1$H NMR (CDCl$_3$, 500 MHz) δ 3.81 (q, 6H), 3.68-3.51 (m, 20H), 3.45 (t, 4H), 2.70 (t, 4H), 2.50 (dd, 2H), 1.54 (m, 6H), 1.35 (m, 4H), 1.22 (t, 9H), 0.91 (t, 6H), 0.56 (dd, 2H).

Preparation Example 5

Preparation of N-(2-(2-(2-methoxyethoxy)ethoxy)ethyl)-3-(triethoxysilyl)-N-(3-triethoxysilyl)propyl)propan-1-amine 10.45 g (75 mmol) of triethylamine was added to 25 ml of acetonitrile, in which 21.3 g (50 mmol) of bis(3-(triethoxysilyl)propyl)amine was dissolved, and stirred. 25 ml of acetonitrile, in which 19.1 g (60 mmol) of 2-(2-(2-methoxyethoxy)ethoxy)ethyl 4-methylbenzenesulfonate was dissolved, was added to the stirred reaction solution, and then stirred for 24 hours while heating at 70° C. Thereafter, after a volatile solvent was removed under reduced pressure and a residue was extracted with hexane, the hexane was removed by vacuum distillation to obtain 20.0 g (41 mmol, 70% yield) of light yellow oil as a compound having a structure of the following Formula 1e, and a $^1$H nuclear magnetic resonance spectrum was observed.

[Formula 1e]

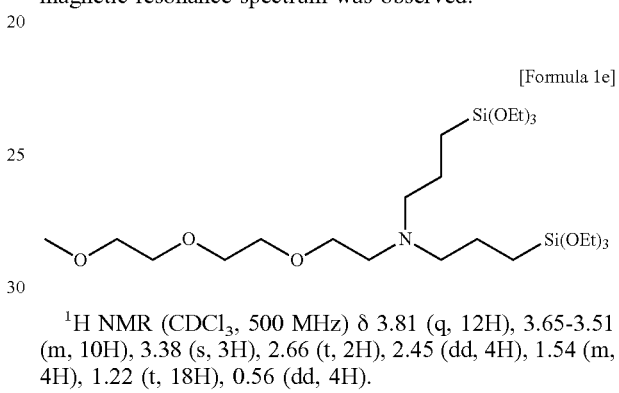

$^1$H NMR (CDCl$_3$, 500 MHz) δ 3.81 (q, 12H), 3.65-3.51 (m, 10H), 3.38 (s, 3H), 2.66 (t, 2H), 2.45 (dd, 4H), 1.54 (m, 4H), 1.22 (t, 18H), 0.56 (dd, 4H).

Preparation Example 6

Preparation of N-(2-(2-(2-methoxyethoxy)ethoxy)ethyl)-N-(3-(trimethoxysilyl)propyl)butan-1-amine 9.1 g (90 mmol) of triethylamine was added to 30 ml of acetonitrile, in which 14.1 g (60 mmol) of N-(3-(trimethoxysilyl)propyl)butan-1-amine was dissolved, and stirred. 30 ml of acetonitrile, in which 22.9 g (72 mmol) of 2-(2-(2-methoxyethoxy)ethoxy)ethyl 4-methylbenzenesulfonate was dissolved, was added to the stirred reaction solution, and then stirred for 24 hours while heating at 70° C. Thereafter, after a volatile solvent was removed under reduced pressure and a residue was extracted with hexane, the hexane was removed by vacuum distillation to obtain 16.9 g (44.4 mmol, 74% yield) of light yellow oil as a compound having a structure of the following Formula 1f, and a $^1$H nuclear magnetic resonance spectrum was observed.

[Formula 1f]

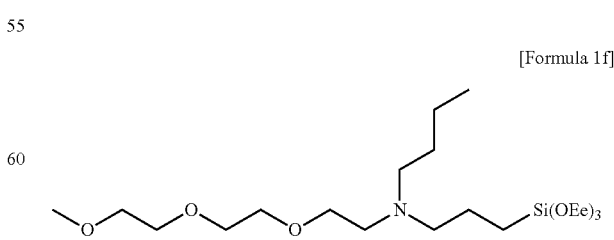

$^1$H NMR (CDCl$_3$, 500 MHz) δ 3.57 (s, 9H), 3.61-3.45 (m, 10H), 3.36 (s, 3H), 2.59 (t, 2H), 2.49 (m, 4H), 1.58 (m, 2H), 1.40 (m, 2H), 1.25 (m, 2H), 0.91 (t, 3H), 0.56 (dd, 2H).

Preparation Example 7

Preparation of N-(3,6,9,12-tetraoxahexadecyl)-N-(3-(triethoxysilyl)propyl)-3,6,9,12-tetraoxahexadecan-1-amine 60.34 g (596.28 mmol) of triethylamine was added to 90 ml of acetonitrile, in which 40.0 g (180.69 mmol) of 3-(triethoxysilyl)propan-1-amine was dissolved, and stirred. 90 ml of acetonitrile, in which 204.9 g (505.94 mmol) of 3,6.9,12-tetraoxahexadecyl 4-methylbenzenesulfonate was dissolved, was added to the stirred reaction solution, and then stirred for 12 hours while heating at 80° C. Thereafter, after a volatile solvent was removed under reduced pressure and a residue was extracted with hexane, the hexane was removed by vacuum distillation to obtain 93.0 g (135.5 mmol, 75% yield) of light yellow oil as a compound having a structure of the following Formula 1g, and a $^1$H nuclear magnetic resonance spectrum was observed.

[Formula 1g]

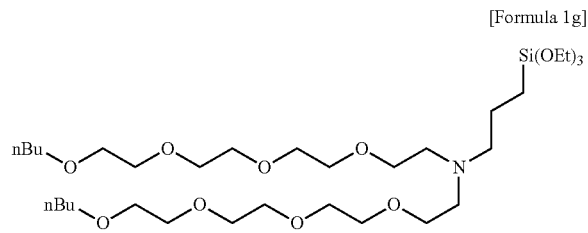

$^1$H NMR(CDCl$_3$, 500 MHz) δ 3.81 (q, 6H), 3.66-3.58 (m, 26H), 3.53 (t, 4H), 3.46 (t, 4H), 2.71 (t, 2H), 2.51 (t, 2H), 1.56 (m, 6H), 1.35 (m, 4H), 1.23 (t, 9H), 0.92 (t, 6H), 0.56 (t, 2H).

Preparation Example 8

Preparation of N-(3,6,9,12,15-pentaoxanonandecyl)-N-(3-(triethoxysilyl)propyl)-3,6,9,12,15-pentaoxanonandecan-1-amine 60.34 g (596.28 mmol) of triethylamine was added to 90 ml of acetonitrile, in which 40.0 g (180.69 mmol) of 3-(triethoxysilyl)propan-1-amine was dissolved, and stirred. 90 ml of acetonitrile, in which 226.95 g (505.94 mmol) of 3,6.9,12,15-pentaoxanonyldecyl 4-methylbenzenesulfonate was dissolved, was added to the stirred reaction solution, and then stirred for 12 hours while heating at 80° C. Thereafter, after a volatile solvent was removed under reduced pressure and a residue was extracted with hexane, the hexane was removed by vacuum distillation to obtain 105.1 g (135.4 mmol, 75% yield) of light yellow oil as a compound having a structure of the following Formula 1h, and a $^1$H nuclear magnetic resonance spectrum was observed.

[Formula 1h]

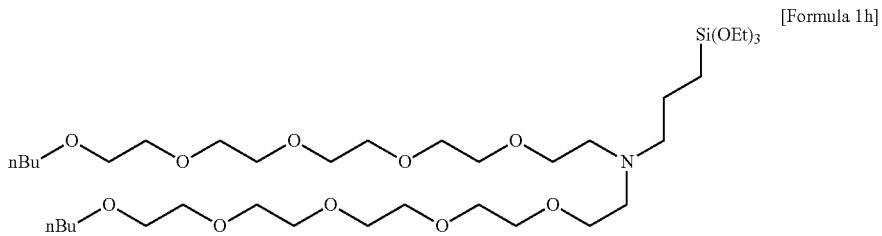

$^1$H NMR(CDCl$_3$, 500 MHz) δ 3.81 (q, 6H), 3.66-3.58 (m, 30H), 3.53 (t, 4H), 3.46 (t, 4H), 2.71 (t, 2H), 2.51 (t, 2H), 1.56 (m, 6H), 1.35 (m, 4H), 1.23 (t, 9H), 0.92 (t, 6H), 0.56 (t, 2H).

Preparation Example 9

Preparation of N,N-bis(3-(triethoxysilyl)propyl)-3,6,9,12,15,18-hexaoxodocosan-1-amine 102.7 g (1014.96 mmol) of triethylamine was added to 300 ml of acetonitrile, in which 144.03 g (338.32 mmol) of bis(3-(triethoxysilyl)propyl)amine was dissolved, and stirred. 200 ml of acetonitrile, in which 200.95 g (405.99 mmol) of 3,6,9,12,15,18-hexaoxadocosyl 4-methylbenzenesulfonate was dissolved, was added to the stirred reaction solution, and then stirred for 12 hours while heating at 80° C. Thereafter, after a volatile solvent was removed under reduced pressure and a residue was extracted with hexane, the hexane was removed by vacuum distillation to obtain 185.40 g (248.5 mmol, 73.44% yield) of light yellow oil as a compound having a structure of the following Formula 1i, and a $^1$H nuclear magnetic resonance spectrum was observed.

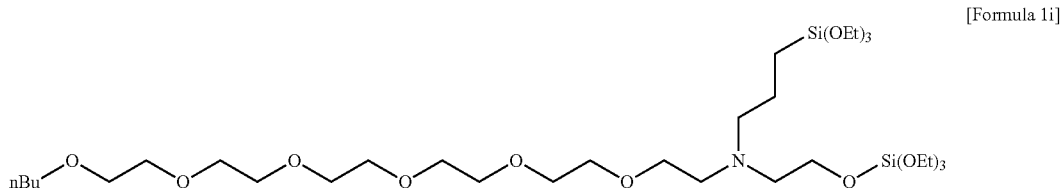

[Formula 1i]

$^1$H NMR (CDCl$_3$, 500 MHz) δ 3.83-3.79 (q, 12H), 3.65-3.63 (m, 20H), 3.58-3.56 (m, 4H), 3.46-3.43 (t, 2H), 3.08-3.04 (m, 4H), 1.79-1.69 (m, 4H), 1.58-1.53 (m, 2H), 1.39-1.33 (m, 2H), 1.23-1.20 (t, 18H), 0.92-0.89 (t, 3H), 0.60-0.58 (t, 4H).

EXAMPLES

Example 1

85 wt % of n-hexane, from which impurities, such as moisture, were removed, and 15 wt % of a monomer mixture (73 wt % of butadiene and 27 wt % of styrene) were continuously added at a total flow rate of 400 g/hr to a raw material input line of a first reactor among three continuous stirred-tank reactors (CSTR). Also, n-butyllithium for initiating a reaction was added to the input line, and ditetrahydrofurylpropane (DTP), as a polar additive, was added in a molar ratio of 0.5 to 3 with respect to a molar amount of the n-butyllithium. Next, an internal temperature of the reactor was controlled to be in a range of 70° C. to 85° C. and was maintained for 30 minutes to 60 minutes. Thereafter, a polymer of the first reactor thus obtained was continuously supplied to the top of a second reactor, and an internal temperature of the reactor was controlled to be in a range of 70° C. to 85° C. and was maintained for 60 minutes so that a polymerization conversion rate was 90%. A polymer of the second reactor thus obtained was continuously supplied to the top of a third reactor, the compound represented by Formula 1a, which was prepared in Preparation Example 1, was continuously supplied in a molar amount equivalent to that of the n-butyllithium to perform a modification reaction. A solution including 5 wt % to 10 wt % of ethyl alcohol and 25 wt % to 35 wt % of an antioxidant (Wingstay-K) was added to a polymer of the third reactor thus obtained at a rate of 1.005 ml/min to stop the polymerization reaction, and a polymer was obtained. After the polymer obtained was put in hot water heated by steam and stirred to remove the solvent, the residual solvent and water were removed by roll drying to prepare a modified conjugated diene-based polymer. The results of the analysis of the modified conjugated diene-based polymer thus prepared are presented in Table 1 below.

Example 2

Example 2 was performed in the same manner as in Example 1 except that the compound represented by Formula 1b which was prepared in Preparation Example 2, instead of the compound represented by Formula 1a which was prepared in Preparation Example 1, was added in the same molar amount in Example 1.

Example 3

Example 3 was performed in the same manner as in Example 1 except that the compound represented by Formula 1d which was prepared in Preparation Example 4, instead of the compound represented by Formula 1a which was prepared in Preparation Example 1, was added in the same molar amount in Example 1.

Example 4

Example 4 was performed in the same manner as in Example 1 except that the compound represented by Formula 1e which was prepared in Preparation Example 5, instead of the compound represented by Formula 1a which was prepared in Preparation Example 1, was added in the same molar amount in Example 1.

Example 5

Example 5 was performed in the same manner as in Example 1 except that the compound represented by Formula 1g which was prepared in Preparation Example 7, instead of the compound represented by Formula 1a which was prepared in Preparation Example 1, was added in the same molar amount in Example 1.

Example 6

Example 6 was performed in the same manner as in Example 1 except that the compound represented by Formula 1h which was prepared in Preparation Example 8, instead of the compound represented by Formula 1a which was prepared in Preparation Example 1, was added in the same molar amount in Example 1.

Comparative Example 1

Comparative Example 1 was performed in the same manner as in Example 1 except that the compound represented by Formula 1a, which was prepared in Preparation Example 1, was not added in Example 1.

Experimental Examples

Experimental Example 1

A weight-average molecular weight (Mw, ×10$^3$ g/mol), a number-average molecular weight (Mn, ×10$^3$ g/mol), a molecular weight distribution (MWD), and Mooney viscosity (MV) were respectively measured for the modified or unmodified conjugated diene-based polymers prepared in the examples and comparative example. The results thereof are presented in Table 1 below.

The weight-average molecular weight (Mw) and the number-average molecular weight (Mn) were measured by gel permeation chromatograph (GPC) analysis, and the molecular weight distribution (MWD, Mw/Mn) was obtained by calculation using each molecular weight measured. Specifically, with respect to the GPC, two PLgel Olexis columns (Polymer Laboratories) and one PLgel mixed-C column (Polymer Laboratories) were combined and used, all newly replaced columns were mixed-bed type columns, and polystyrene (PS) was used as a GPC standard material for the calculation of the molecular weight.

The Mooney viscosity (MV, (ML1+4, @100° C.) MU) was measured with a large rotor at a rotor speed of 2±0.02 rpm at 100° C. using MV-2000 (ALPHA Technologies). After samples used in this case were left standing for 30 minutes or more at room temperature (23±3° C.), 27±3 g of each sample was taken and filled into a die cavity, and the Mooney viscosity was measured for 4 minutes by operating a platen.

TABLE 1

| Category | Example | | | | | | Comparative Example |
|---|---|---|---|---|---|---|---|
| | 1 | 2 | 3 | 4 | 5 | 6 | 1 |
| Mw ($\times 10^3$ g/mol) | 1,020 | 622 | 628 | 941 | 695 | 683 | 738 |
| Mn ($\times 10^3$ g/mol) | 434 | 339 | 338 | 406 | 384 | 378 | 419 |
| MWD (Mw/Mn) | 2.35 | 1.84 | 1.88 | 2.32 | 1.81 | 1.84 | 1.76 |
| MV (ML1 + 4, @ 100° c.) | 103.4 | 84.3 | 81.6 | 98.8 | 89.5 | 88.3 | 63.7 |

Experimental Example 2

In order to comparatively analyze physical properties of rubber compositions including each of the modified or unmodified conjugated diene-based polymers prepared in the examples and comparative example and molded articles prepared therefrom, tensile properties, abrasion resistance, and wet road surface resistance were respectively measured, and the results thereof are presented in Table 3 below.

1) Preparation of Rubber Samples

Each of the modified or unmodified styrene-butadiene copolymers of the examples and comparative example was used as a raw material rubber and was mixed under mixing conditions shown in Table 2 below. An amount of each raw material in Table 2 was represented by parts by weight based on 100 parts by weight of the rubber.

TABLE 2

| Category | Raw material | Amount (parts by weight) |
|---|---|---|
| First stage kneading | Rubber | 100 |
| | Silica | 70 |
| | Coupling agent/carbon black | 11.2 |
| | Process oil | 37.5 |
| | Zinc white | 3 |
| | Stearic acid | 2 |
| | Antioxidant | 2 |
| | Anti-aging agent | 2 |
| | Wax | 1 |
| Second stage kneading | Sulfur | 1.5 |
| | Primary vulcanization accelerator | 1.75 |
| | Secondary vulcanization accelerator | 2 |

Specifically, the rubber samples were kneaded through first stage kneading and second stage kneading. In the first stage kneading, the raw material rubber (styrene-butadiene copolymer), filler, organosilane coupling agent, process oil, zinc white, stearic acid, antioxidant, anti-aging agent, and wax were kneaded using a 1.6-liter Banbury mixer equipped with a temperature control device. In this case, an initial temperature of the mixer was controlled to be 70° C. and, after the completion of the mixing, a formulation obtained at a discharge temperature of 150° C. to 160° C. was formed into a synthetic rubber sheet with a roll mill set at 50° C. to obtain a primary formulation. In the second stage kneading, after the primary formulation was cooled to room temperature, the primary formulation, sulfur, a primary vulcanization accelerator and a secondary vulcanization accelerator were added to the mixer, mixing was performed in a state in which the temperature of the mixer was controlled to be 40° C., and a formulation obtained at a discharge temperature of 110° C. or less was formed into a synthetic rubber sheet with a roll mill set at 50° C. to obtain a secondary formulation. Thereafter, a curing process was performed at 160° C. for 20 minutes to 30 minutes to prepare each rubber sample.

2) Tensile Properties

Each specimen was prepared according to the tensile test method of ASTM 412, and tensile strength at break of the specimen and tensile stress at 300% elongation (300% modulus) were measured for tensile properties. Specifically, the tensile properties were measured at a rate of 50 cm/min at room temperature using a tensile testing machine, a Universal Test Machine 4204 (Instron).

3) Abrasion Resistance

Abrasion resistances of the rubber samples prepared were measured using a DIN abrasion tester in such a manner that, after a load of 10 N was applied to a rotating drum with abrasive paper and each rubber sample was moved in a direction perpendicular to a rotational direction of the drum, an abrasion weight loss was measured. A rotational speed of the drum was 40 rpm, and a total movement of the sample at the completion of the test was 40 m. The smaller the weight loss was, the better the abrasion resistance was.

4) Viscoelastic Properties

With respect to viscoelastic properties, tan δ was measured in a torsion mode at a frequency of 10 Hz while changing a strain at each measurement temperature (−60° C. to 70° C.) using a dynamic mechanical analyzer (TA Instruments). The Payne effect was expressed as the difference between the maximum value and the minimum value at a strain of 0.28% to 40%. The higher the tan δ at a low temperature of 0° C. was, the better the wet road surface resistance was, and the lower the tan δ at a high temperature of 60° C. was, the lower the hysteresis loss was and the better the low running resistance (fuel economy) was.

TABLE 3

| Category | | Example 1 | 2 | 3 | 4 | 5 | 6 | Comparative Example 1 |
|---|---|---|---|---|---|---|---|---|
| Tensile properties | 300% modulus (kgf/cm²) | 121.6 | 123.2 | 123.2 | 119.8 | 123.0 | 122.8 | 119.1 |
| | Tensile strength (kgf/cm²) | 192.0 | 197.7 | 197.7 | 180.7 | 195.9 | 196.3 | 184.6 |
| Abrasion resistance | Weight loss (g) | 0.1391 | 0.1378 | 0.1397 | 0.1387 | 0.1380 | 0.1365 | 0.1407 |
| Viscoelasticity | tan δ @ 0° C. | 0.7743 | 0.7801 | 0.7770 | 0.7618 | 0.7785 | 0.7810 | 0.7602 |
| | tan δ @ 60° C. | 0.1128 | 0.1080 | 0.1092 | 0.1140 | 0.1001 | 0.0982 | 0.1498 |

As illustrated in Table 3, with respect to Examples 1 to 6 prepared according to the present invention, it may be confirmed that wet road surface resistance was excellent and, particularly, abrasion resistance and low fuel consumption property were significantly improved while exhibiting tensile properties equal to or better than those of Comparative Example 1 in which modification was not performed. Furthermore, as confirmed in Examples 3, 5, and 6, the tendency, in which the abrasion resistance and low fuel consumption property as well as the wet road surface resistance were further improved while the tensile properties were improved as the number of oxygen atoms included in the glycol unit in the modifier was increased, may also be confirmed.

The invention claimed is:

1. An amino silane-based compound represented by Formula 1:

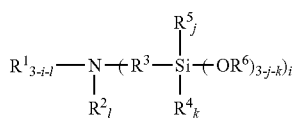

[Formula 1]

wherein, in Formula 1, $R^1$ and $R^2$ are each independently a glycol unit represented by

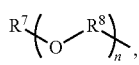

$R^3$ is a divalent hydrocarbon group having 1 to 30 carbon atoms, $R^4$, $R^5$, $R^6$, and $R^7$ are each independently a monovalent hydrocarbon group having 1 to 30 carbon atoms, $R^8$ is a divalent hydrocarbon group having 1 to 10 carbon atoms, j and k are each independently 0 or 1, n is an integer selected from 2 to 10, wherein i is 1 or 2, and l is 0 or 1.

2. The amino silane-based compound of claim 1, wherein in Formula 1, $R^3$ is an alkylene group having 1 to 10 carbon atoms, $R^4$, $R^5$, $R^6$, and $R^7$ are each independently an alkyl group having 1 to 10 carbon atoms, $R^8$ is an alkylene group having 1 to 5 carbon atoms, n is an integer selected from 2 to 8.

3. The amino silane-based compound of claim 1, wherein the amino silane-based compound represented by Formula 1 is a compound represented by Formula 1-1:

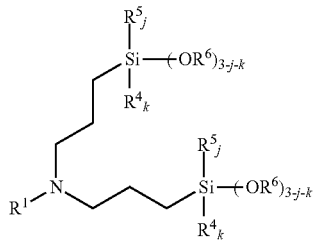

[Formula 1-1]

wherein, in Formula 1-1, $R^1$ is a glycol unit represented by

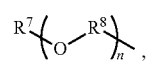

$R^4$, $R^5$, $R^6$, and $R^7$ are each independently a monovalent hydrocarbon group having 1 to 30 carbon atoms, $R^8$ is a divalent hydrocarbon group having 1 to 10 carbon atoms, j and k are each independently 0 or 1, and n is an integer selected from 2 to 10.

4. The amino silane-based compound of claim 1, wherein the amino silane-based compound represented by Formula 1 is a compound represented by Formula 1-2:

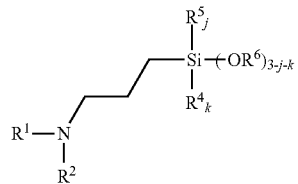

[Formula 1-2]

wherein, in Formula 1-2, $R^1$ and $R^2$ are each independently a glycol unit represented by

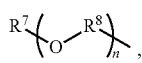

R$^4$, R$^5$, R$^6$, and R$^7$ are each independently a monovalent hydrocarbon group having 1 to 30 carbon atoms, R$^8$ is a divalent hydrocarbon group having 1 to 10 carbon atoms, j and k are each independently 0 or 1, and n is an integer selected from 1 to 10.

5. A method of preparing an amino silane-based compound of claim 1, comprising:

reacting a compound represented by Formula 2 with a compound represented by Formula 3 in a polar solvent:

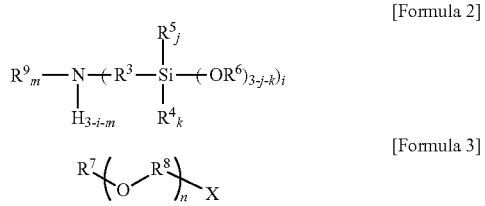

[Formula 2]

[Formula 3]

wherein, in Formulae 2 and 3,

R$^3$ is a divalent hydrocarbon group having 1 to 30 carbon atoms,

R$^4$, R$^5$, R$^6$, R$^7$, and R$^9$ are each independently a monovalent hydrocarbon group having 1 to 30 carbon atoms, R$^8$ is a divalent hydrocarbon group having 1 to 10 carbon atoms, i is 1 or 2, j and k are each independently 0 or 1, m is 0, n is an integer selected from 1 to 10, and X is a leaving group selected from the group consisting of a mesylate group, a tosylate group, and triflate group.

6. The method of claim 5, wherein a molar ratio of the compound represented by Formula 2 to the compound represented by Formula 3 is in a range of 1:1 to 1:5.

7. The method of claim 5, wherein the reacting step is performed at a reaction temperature of 10° C. to 100° C.

8. The method of claim 5, wherein the reacting step further comprises:

reacting the compound represented by Formula 2 with the compound represented by Formula 3 in the presence a polar additive in the polar solvent.

9. The method of claim 8, wherein the polar additive is an inorganic material or an organic material, wherein the inorganic material comprises a hydride containing an alkali metal or alkaline earth metal, a hydroxide containing an alkali metal or alkaline earth metal, a carbonate containing an alkali metal or alkaline earth metal, or a mixture thereof, and the organic material comprises an amine-based base, an alkoxy-based base, or a mixture thereof.

10. A modified conjugated diene-based polymer, comprising:

a conjugated diene-based monomer-derived repeating unit; and the amino silane-based compound of claim 1 as a function group at one end of the polymer.

11. The modified conjugated diene-based polymer of claim 10, further comprising an aromatic vinyl monomer-derived repeating unit.

12. The modified conjugated diene-based polymer of claim 10, wherein the modified conjugated diene-based polymer has a number-average molecular weight (Mn) of 10,000 g/mol to 2,000,000 g/mol.

13. The modified conjugated diene-based polymer of claim 10, wherein the modified conjugated diene-based polymer has a molecular weight distribution (Mw/Mn) of 1.0 to 5.0.

14. A method of preparing a modified conjugated diene-based polymer, the method comprising:

polymerizing a conjugated diene-based monomer, or an aromatic vinyl-based monomer and the conjugated diene-based monomer, in a hydrocarbon solvent including an organometallic compound to prepare an active polymer coupled with an organometal; and reacting the active polymer coupled with the organometal with an amino silane-based compound represented by Formula 1:

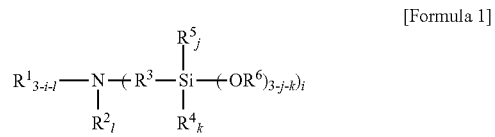

[Formula 1]

wherein, in Formula 1,

R$^1$ and R$^2$ are each independently a hydrocarbon group having 1 to 30 carbon atoms, or a glycol unit represented by

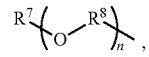

R$^3$ is a divalent hydrocarbon group having 1 to 30 carbon atoms,

R$^4$, R$^5$, R$^6$, and R$^7$ are each independently a monovalent hydrocarbon group having 1 to 30 carbon atoms, R$^8$ is a divalent hydrocarbon group having 1 to 10 carbon atoms, j and k are each independently 0 or 1, n is an integer selected from 1 to 10, at least one of R$^1$ and R$^2$ is a glycol unit represented by

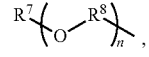

i is 1 or 2, l is 0 or 1, and 3-i-l is 1 or 2 when R$^1$ is a glycol unit represented by

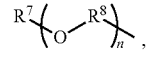

i and l are each independently 1 or 2, but are not 2 at the same time, and 3-i-l is 0 or 1 when R$^2$ is a glycol unit represented by

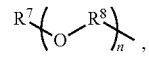

and i is 1 or 2, l is 0 or 1, and 3-i-l is 0 or 1 when both $R^1$ and $R^2$ are glycol units represented by

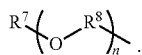

15. The method of claim 14, wherein the organometallic compound is used in an amount of 0.01 mmol to 10 mmol based on total 100 g of the monomer(s).

16. The method of claim 14, wherein the organometallic compound comprises at least one selected from the group consisting of methyllithium, ethyllithium, propyllithium, n-butyllithium, s-butyllithium, t-butyllithium, hexyllithium, n-decyllithium, t-octyllithium, phenyllithium, 1-naphthyllithium, n-eicosyllithium, 4-butylphenyllithium, 4-tolyllithium, cyclohexyllithium, 3,5-di-n-heptylcyclohexyllithium, 4-cyclopentyllithium, naphtylsodium, naphtylpotassium, lithium alkoxide, sodium alkoxide, potassium alkoxide, lithium sulfonate, sodium sulfonate, potassium sulfonate, lithium amide, sodium amide, potassium amide, and lithium isopropylamide.

17. The method of claim 14, wherein the hydrocarbon solvent further includes a polar additive.

18. The method of claim 17, wherein the polar additive comprises at least one selected from the group consisting of tetrahydrofuran, ditetrahydrofurylpropane, diethylether, cycloamylether, dipropyl ether, ethylene dimethyl ether, diethyl glycol, dimethyl ether, tertiary butoxyethoxyethane, bis(3-dimethylaminoethyl)ether, (dimethylaminoethyl)ethylether, trimethylamine, triethylamine, tripropylamine, and tetramethylethylenediamine.

19. The amino silane-based compound selected from the group consisting of N,N-bis(3-(triethoxysilyl)propyl)-2,5,8,11,14-pentaoxyhexadecan-16-amine, N,N-bis(3-(diethoxy(methyl)silyl)propyl)-2,5,8,11,14-pentaoxyhexadecan-16-amine, N,N-bis(2-(2-(2-methoxyethoxy)ethoxy)ethyl)-3-(triethoxysilyl)propan-1-amine, N,N-bis(2-(2-(2-butoxyethoxy)ethoxy)ethyl)-3-(triethoxysilyl)propan-1-amine, N-(2-(2-(2-methoxyethoxy)ethyl)-3-(triethoxysilyl)-N-(3-(triethoxysilyl)propyl)propan-1-amine, N-(2-(2-(2-methoxyethoxy)ethoxy)ethyl)-N-(3-(trimethyoxysilyl)propyl)butan-1-amine, N-(3,6,9,12-tetraoxahexadecyl)-N-(3-(triethoxysilyl)propyl)-3,6,9,12-tetraoxahexadecan-1-amine, N-(3,6,9,12,15-pentaoxanonandecyl)-N-(3-(triethoxysilyl)propyl)-3,6,9,12,15-pentaoxanonandecan-1-amine, and N,N-bis(3-(triethoxysilyl)propyl)-3,6,9,12,15,18-hexaoxodocosan-1-amine.

* * * * *